UNITED STATES PATENT OFFICE.

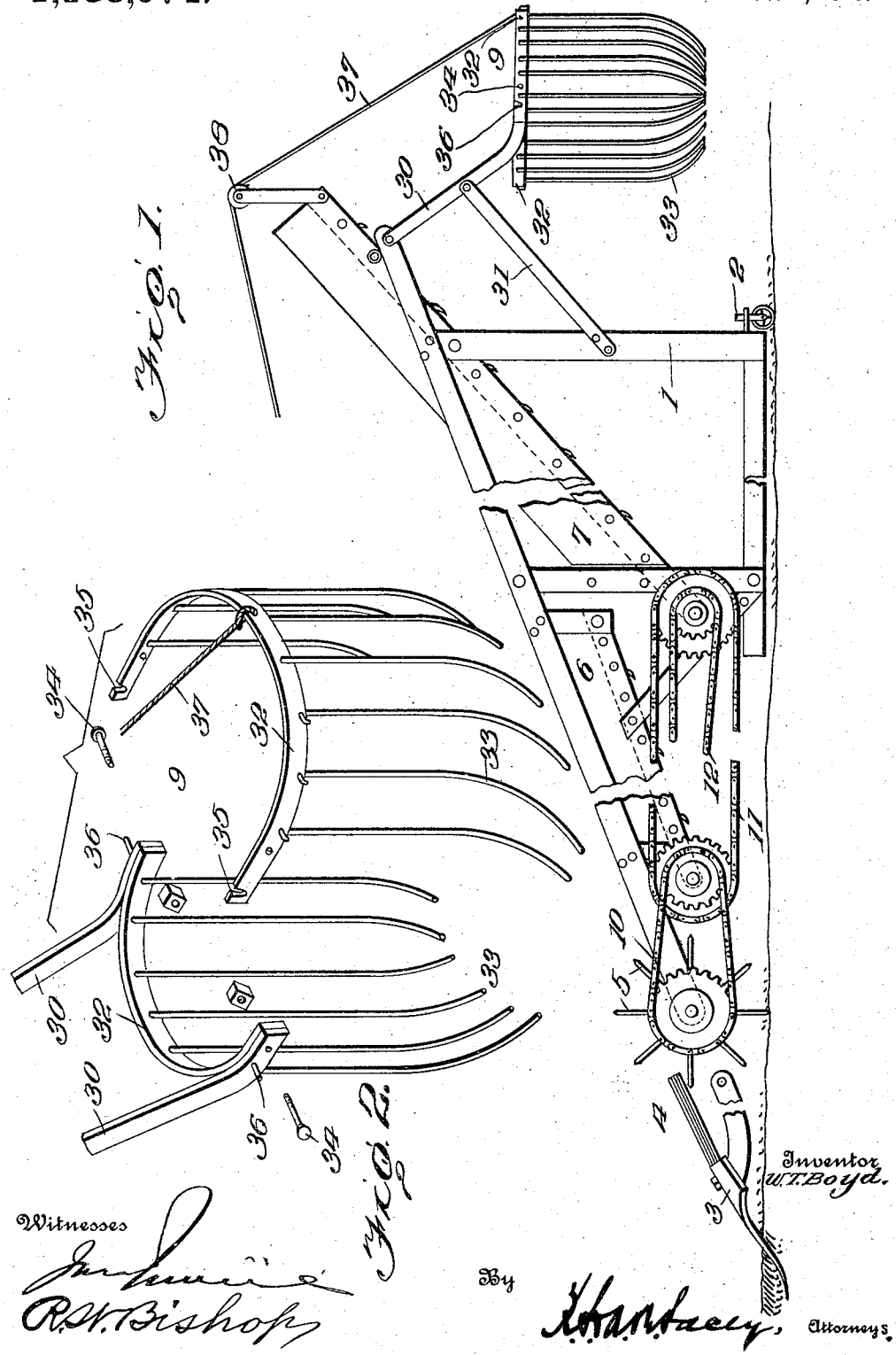

WILLIAM T. BOYD, OF SCRANTON, TEXAS.

RECEPTACLE FOR PEANUT-HARVESTERS.

1,158,974.    Specification of Letters Patent.    Patented Nov. 2, 1915.

Original application filed June 11, 1914, Serial No. 844,539. Divided and this application filed December 23, 1914. Serial No. 878,759.

*To all whom it may concern:*

Be it known that I, WILLIAM T. BOYD, a citizen of the United States, residing at Scranton, in the county of Eastland and State of Texas, have invented certain new and useful Improvements in Receptacles for Peanut-Harvesters, of which the following is a specification.

This invention relates to receptacles for peanut harvesters, and has for its object the provision of a simple and inexpensive receptacle which may be carried upon the rear end of a peanut harvester in position to receive the vines therefrom and be readily operated at intervals to discharge the vines in bundles, the present application being a division of an application filed by me June 11th, 1914, Serial No. 844,539.

The object of the present invention is attained in the use of a device such as illustrated in the accompanying drawings, and the invention resides in certain novel features which will be particularly pointed out in the claim following the detailed description.

In the accompanying drawings: Figure 1 is an elevation of a peanut harvester having my improved receptacle mounted thereon; Fig. 2 is a detail perspective view of the receptacle, showing the members thereof separated but approximately in their relative positions.

The peanut harvester employed by me comprises a frame 1 supported at its rear end by a caster wheel 2 and adapted to be connected at its front end with an ordinary cultivator or other wheeled agricultural implement. A plow 3 is provided which is also carried by the cultivator or other wheeled machine, and this plow is provided at its rear edge with vine-directing fingers 4 over which the up-rooted vines pass and between which the loose sand or dirt may fall from the vines. In rear of said plow and at the front end of the frame 1 is a revolving rake or take-up roller 5 which is adapted to engage the vines as they pass from the separating fingers 4 and deliver them onto a conveyer mounted on the portion 6 of the main frame. The said conveyer delivers the vines onto an elevator mounted in the portion 7 of the main frame, and the said elevator delivers the vines into the receptacle indicated generally at 9. The rake 5 is actuated by a sprocket chain 10 and suitable sprocket wheels whereby it is connected with the conveyer, and the said conveyer is in turn connected by a sprocket chain 11 and suitable sprocket wheels with the elevator. Power is applied to the elevator from the wheels of the planter by a sprocket chain 12, as will be readily understood.

To the rear extremities of the side bars of the main frame, I secure the rigid brackets or downwardly and rearwardly projecting arms 30 which are reinforced by braces 31 extending therefrom to the main frame 1, and to the lower extremities of the said arms, I secure rigidly one member of the receptacle. Said receptacle consists of a divided ring or annular band 32 and rods 33 secured rigidly to the said band and depending therefrom, the lower extremities of said rods being turned inwardly so as to converge toward the axis of the said ring or band and thereby form a support for the vines delivered to the receptacle. The forward member of the annular band is secured rigidly to the lower ends of the arms 30 by bolts 34 inserted therethrough and the rear member of the said band is pivotally mounted upon the same bolts, the extremities of the said rear member of the band being extended inwardly beyond the pivotal points and provided with notches 35 in their upper edges adapted to engage pins or studs 36 projecting laterally from the arms 30 in advance of the extremities of the same.

The weight of the rear member of the band or ring and the rods carried thereby, together with the weight of the vines placed in the receptacle, tends to swing the rear member of the receptacle downwardly upon its pivots and this tendency is checked by the provision of the pins or studs 36 and the notches 35 engaging the same so that, when the vines are being fed into the receptacle, the members thereof will be held in their proper normal positions so as to receive and hold a large quantity of the vines. When the receptacle is full, a pull is exerted upon the cable or flexible operating member 37 which is secured to the upper edge of the rear member of the receptacle and extends upwardly and forwardly therefrom to the planter or cultivator, being guided by an idler or pulley 38 suitably supported on the upper rear end of the elevator. When a pull is exerted upon the cable or operating member 37, the rear member of the receptacle will be swung upon its pivotal support so that the lower ends of its rods 33 will move away from the lower ends of the rods carried by the forward member of the receptacle and the contents thereof will be thereby discharged onto the ground.

Having thus described the invention, what is claimed as new is:—

The combination with a supporting frame, of a receptacle comprising pendent members, brackets extending downwardly from the frame and rigidly secured to one member of the receptacle and pivotally secured to the other member of the receptacle, stops on the brackets, the pivotally mounted member of the receptacle being provided with notches to engage said stops, and means for swinging the said member of the receptacle upon its pivotal supports.

In testimony whereof I affix my signature in presence of two witnesses.

WILLIAM T. BOYD. [L. S.]

Witnesses:
J. A. REYNOLDS,
J. D. STELL.

Copies of this patent may be obtained for five cents each, by addressing the "Commissioner of Patents, Washington, D. C."